United States Patent
Iden et al.

(10) Patent No.: US 9,033,285 B2
(45) Date of Patent: May 19, 2015

(54) CONTAINERIZED LOCOMOTIVE DISTRIBUTED POWER CONTROL

(71) Applicant: Union Pacific Railroad Company, Omaha, NE (US)

(72) Inventors: Michael E. Iden, Kildeer, IL (US); Mark A. Henry, Omaha, NE (US)

(73) Assignee: UNION PACIFIC RAILROAD COMPANY, Omaha, NE (US)

( * ) Notice: Subject to any disclaimer, the term of this patent is extended or adjusted under 35 U.S.C. 154(b) by 242 days.

(21) Appl. No.: 13/831,251

(22) Filed: Mar. 14, 2013

(65) Prior Publication Data

US 2014/0263860 A1   Sep. 18, 2014

(51) Int. Cl.
*B61C 17/12* (2006.01)

(52) U.S. Cl.
CPC ...................... *B61C 17/12* (2013.01)

(58) Field of Classification Search
CPC ....................................................... B61C 17/12
USPC ........... 246/186, 187 R, 187 A, 187 B, 187 C
See application file for complete search history.

(56) References Cited

U.S. PATENT DOCUMENTS

| | | | | |
|---|---|---|---|---|
| 4,756,256 A | * | 7/1988 | Rains et al. | 105/1.1 |
| 5,681,015 A | * | 10/1997 | Kull | 246/187 C |
| 6,095,618 A | * | 8/2000 | Heneka et al. | 303/3 |
| 6,401,015 B1 | * | 6/2002 | Stewart et al. | 701/19 |
| 6,668,216 B2 | * | 12/2003 | Mays | 701/19 |
| 6,972,670 B2 | * | 12/2005 | LaDuc et al. | 340/438 |
| 7,357,427 B2 | * | 4/2008 | Eadie et al. | 291/3 |
| 7,395,141 B1 | * | 7/2008 | Seck et al. | 701/19 |
| 7,784,409 B2 | * | 8/2010 | Iden et al. | 105/1.1 |
| 8,190,315 B2 | * | 5/2012 | Kraeling et al. | 701/20 |
| 8,280,566 B2 | * | 10/2012 | Foy et al. | 701/19 |
| 8,565,946 B2 | * | 10/2013 | Cooper et al. | 701/19 |
| 8,589,000 B2 | * | 11/2013 | Moffitt et al. | 701/19 |
| 2003/0120400 A1 | * | 6/2003 | Ahmed Baig et al. | 701/19 |
| 2003/0151520 A1 | * | 8/2003 | Kraeling et al. | 340/825.72 |
| 2004/0064223 A1 | | 4/2004 | Horst et al. | |
| 2007/0282494 A1 | * | 12/2007 | Moffitt et al. | 701/19 |
| 2008/0053331 A1 | * | 3/2008 | Marra et al. | 105/26.05 |
| 2009/0293759 A1 | | 12/2009 | Schmitz | |

(Continued)

OTHER PUBLICATIONS http://railworksamerica.com/forum/viewtopic.php?f=31&t=5512&sid.*

(Continued)

*Primary Examiner* — Jason C Smith
(74) *Attorney, Agent, or Firm* — Pillsbury Winthrop Shaw Pittman, LLP

(57) ABSTRACT

A distributed power (DP) control system is contained within a non-freight carrying intermodal container for communicating with and receive instructions and/or commands from a command system of a lead distributed power locomotive within a train. The container is configured to be provided on a car adjacent to a remote non-distributed powered (non-DP) locomotive provided within a length of the train. One or more connection hoses connect the distributed power control system within the container to the non-DP locomotive to control application of at least its brake system.

30 Claims, 5 Drawing Sheets

(56) References Cited

U.S. PATENT DOCUMENTS

| | | | |
|---|---|---|---|
| 2010/0130124 A1* | 5/2010 | Teeter et al. | 455/15 |
| 2011/0061973 A1* | 3/2011 | Iden | 184/3.2 |
| 2013/0261842 A1* | 10/2013 | Cooper et al. | 701/1 |
| 2014/0188306 A1* | 7/2014 | Kumar et al. | 701/2 |
| 2014/0188307 A1* | 7/2014 | Cooper et al. | 701/2 |
| 2014/0188375 A1* | 7/2014 | Kumar et al. | 701/117 |
| 2014/0263860 A1* | 9/2014 | Iden et al. | 246/187 A |
| 2014/0353434 A1* | 12/2014 | Otsubo et al. | 246/186 |
| 2014/0358336 A1* | 12/2014 | Otsubo et al. | 701/19 |

OTHER PUBLICATIONS

"Re: Helper Locomotives", http://newsgroups.derkeiler.com/Archive/Rec/rec.models.railroad/2007-08/msg00062.html, Aug. 11, 2007, 3 pages.

GE Transportation, GE_31_Locotrol_Animation_v8_4x3.swf, Jun. 16, 2010, Video available at http://www.youtube.com/watch?v=Rhobsj-5P_s.

International Search Report and Written Opinion of the International Searching Authority dated Mar. 9, 2015 for Appln. No. PCT/US2014/029165.

* cited by examiner

CONTAINERIZED LOCOMOTIVE DISTRIBUTED POWER CONTROL

BACKGROUND

1. Field of Invention

The present invention is generally related to providing distributed power (DP) control to non-DP locomotive(s). More specifically, the invention relates to a providing a control system for remote locomotive DP control to non-DP locomotives along a length of the train in an intermodal container that can be readily interchanged.

2. Description of Related Art

FIGS. 1 and 2 illustrate examples of how distributed power (DP) systems are currently employed in a length of a train 100. Generally, such trains employ a DP lead or master locomotive unit 102 on a front or lead end of the train with one or more optional non-DP units 104 and another DP remote unit 108 behind and/or on the rear of the train or at a mid point in the train. DP equipment is installed on each locomotive unit 102 and 108 within the train for communication and DP control. Examples of such implementations are shown in U.S. Patent Publications 2008/0053331 A1, 2003/0120400 A1, and 2003/0151520 A1 and U.S. Pat. Nos. 6,972,670, 6,095, 618, and 7,395,141 B1. Additional analysis has shown that an average of two and a half (2.5) DP equipped locomotives are typically used on every two DP unit train due to overequipping of DP technology in locomotive fleet.

The main disadvantage of current DP power setups, especially with mid-train units, is the time and track configuration required to add and remove additional DP-equipped locomotives and/or consists. There are also costs associated with equipping locomotives with the extra control apparatus for DP. Operationally, loss of telemetry signals is coped with in various fail-safe manners.

The present invention endeavors to provide distributed power (DP) control to non-DP locomotives at one or more positions along a train.

SUMMARY

One aspect of this disclosure provides a non-freight carrying intermodal container having a non-freight carrying body configured for stacking with another intermodal container. The body has an intermodal container compatible configuration including a top wall, a bottom wall, end walls, and side walls connected together to form a box with corners at each junction of three of the walls and having corner fittings at each corner. The corner fittings include a plurality of connection openings each configured to receive a part of a mounting device. A distributed power control system is contained within the body that includes at least a controller for controlling application of a brake system. The controller is configured to communicate with and receive instructions and/or commands from a command system of a lead distributed power locomotive within a train. One or more connection hoses are configured to connect the distributed power control system within the body to a non-distributed powered locomotive positioned adjacent to the non-freight carrying intermodal container to control application of at least the brake system of the non-distributed powered locomotive.

Another aspect of this disclosure includes a train including: a lead locomotive having track engaging wheels for pulling the train along a pair of tracks, the lead locomotive being located at a front end of the train and having a distributed power command system for sending instructions and/or commands to one or more remote locomotives within the train; a plurality of container cars coupled rearward of the lead locomotive, each container car having track engaging wheels, wherein one or more of the container cars includes a set of intermodal containers stacked one atop each other; a remote, non-distributed power locomotive having track engaging wheels for pulling the train along a pair of tracks, the remove locomotive being located within the length of the train; and a non-freight carrying body having an intermodal container compatible configuration configured for stacking with another intermodal container in a container car adjacent to the remote locomotive, the non-freight carrying body having a distributed power control system contained within the body for receiving instructions and/or commands from the lead locomotive and one or more connection hoses extending from the distributed power control system and connected to the remote, non-distributed powered locomotive to control application of at least the brake system of the non-distributed powered locomotive.

Other objects, features, and advantages of the present invention will become apparent from the following detailed description, the accompanying drawings, and the appended claims.

DETAILED DESCRIPTION OF THE PREFERRED EMBODIMENT(S)

Figure 1:
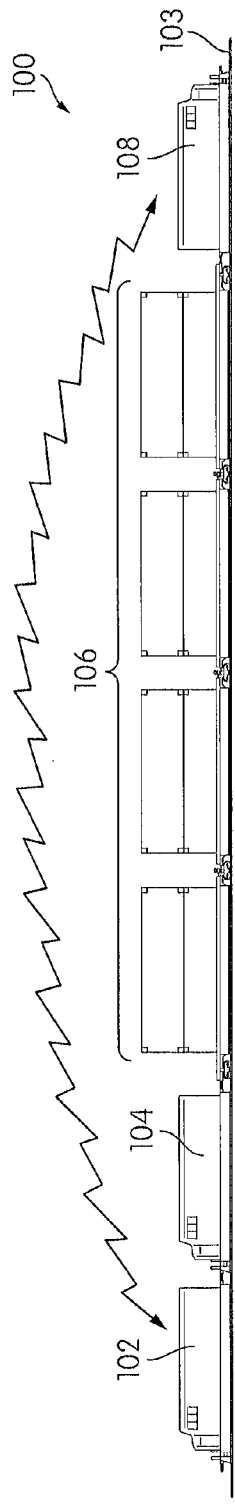
FIGS. 1 and 2 illustrate examples of prior art train configurations employing multiple DP locomotives.
Figure 2:
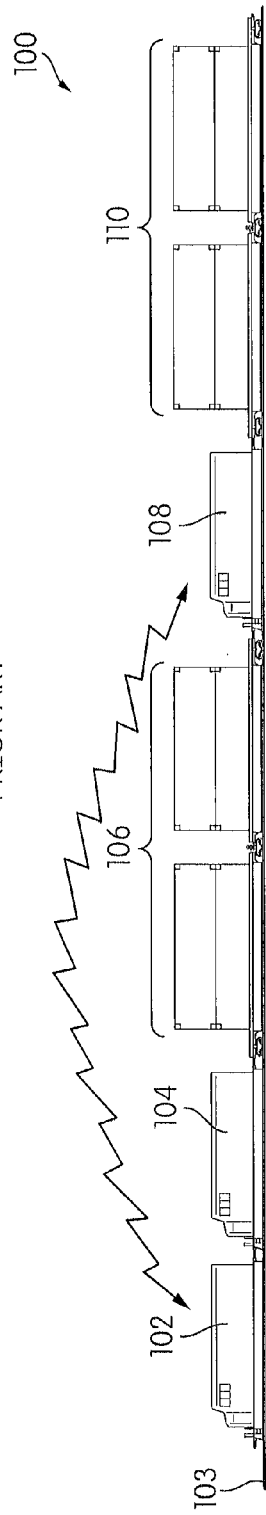

It is a goal of the present invention to control a remote non-distributed power (non-DP) locomotive that is along a length of a train behind a lead distributed power (DP) locomotive using a modified intermodal container with a control system therein. Though intermodal containers are designed to be used in more than one form of transportation, e.g., railway, waterway, and/or highway, the embodiments below are herein described pertaining to their use on a railway.

Distributed power, or DP, is the remote control of unmanned locomotives within and/or at the rear end of a freight train (e.g., behind a manned locomotive). The operator or operating crew may control DP locomotive by radio commands from their control compartment on the manned locomotive at the front of the train, for example. Trains with DP-equipped locomotives are typically longer and heavier, hence more productive than non-DP trains.

The operation of freight trains, powered by locomotives, is a large-scale logistical exercise and challenge. A freight railroad typically includes at least a minimum number of locomotive units needed to operate the trains (which can be one hundred locomotive units operating at any given time on a large U.S. freight railroad, for example). The penalty for failing to have sufficient locomotive units is the inability to operate trains. In the situation involving DP-equipped trains, not having sufficient DP-equipped trains will cause a railroad to not operate DP-equipped trains. This can impact network capacity, traffic flows, and costs (e.g., increasing costs, by forcing operation of more, but shorter length, freight trains), as well as have a negative impact on revenues and profitability. Additional analysis has shown that because of the average number of DP equipped locomotives that are typically used on a train, there tends to be overequipping of DP technology in a locomotive fleet.

As an example, assuming that an average DP-equipped freight train has one (1) DP remote locomotive consist, experience has shown that an average of 2.5 DP-equipped locomotives must be available to operate such a train: for example, in a length of the train, there may be one DP locomotive unit at the front (manned), one DP locomotive unit at the middle or rear-end, and a half (on average) DP locomotive unit "spare," per train, in the rail yard where the DP train is being assembled. Spare DP-equipped locomotive units are necessary to provide protection against inevitable technical issues with DP electronic and microprocessor equipment which can result in a DP-equipped locomotive being unable to operate in DP mode. Such a locomotive cannot control other DP locomotives or operate as a remote DP locomotive.

Thus, if a railroad company is planning to operate, from a rail yard, five (5) DP-equipped trains in a several-hour period (with each train having 2 DP locomotive units, 1 manned at the front and 1 unmanned at the rear end), the railroad company will usually require 5×2.5=12.5, i.e., thirteen (13) DP-equipped locomotives (since locomotives are not divisible) at that rail yard, when only ten (5×2) DP-equipped locomotives are required for operation. The extra DP-equipped locomotive units (in this case, three) that are spare units thus represent a capital investment in onboard DP locomotive equipment which is generally unused (but needed to protect DP train operations and resolve issues).

Further, DP controlled equipment on a diesel locomotive (including special air brakes equipment) can typically cost an additional $100,000 per locomotive, as compared to a non-DP equipped locomotive. Thus, for an example of a railroad company having 1,000 units equipped with DP, it will have invested:

1,000 units×$100,000 (average) per unit=$100,000,000 in DP locomotive equipment

Using the fact that the spare half (0.5) of the DP-equipped locomotive portion of each train (assuming an average of 2.5 DP-equipped locomotive per train length) is equal to approximately $\frac{1}{5}^{th}$ of the DP locomotive equipment (0.5/2.5=$\frac{1}{5}$), then a total of one-fifth of the DP locomotive equipment bought or own by the railroad company is provided as extra or "spare" equipment solely to provide protection and backup functionality. Such a railroad company will have approximately $\frac{1}{5}$×$100 million=$20 million in excess equipment that sits generally unused in the yard. This extra 0.5 in equipment can be a substantial, but poorly-made investment, but is necessary to avoid train delays, etc. should there be issues.

As previously noted above, existing applications of DP control are confined to DP systems provided on both a lead locomotive and a remote locomotive within a train. However, the present invention of using a control system and one or more connection devices that are installed inside of a modified intermodal (ISO) container that reduces the time and track configurations required to assemble trains (when using multiple DP locomotives), enables or increases the handling of the container using existing railyard equipment e.g., container cranes, spreaders, lift systems, chasses and tractors) and reduces labor costs as well. This filing proposes to use containers, with DP equipment installed inside, to facilitate the control of non-DP equipped locomotives as mid-train or rear-end remote control locomotives. This would apply to "container" trains which handle intermodal freight containers, for example. The container is a non-freight carrying container, and therefore non-revenue generating (i.e., items or goods are not transported therein). Additional advantages for such a container will become further evident throughout the description below.

Figure 3:
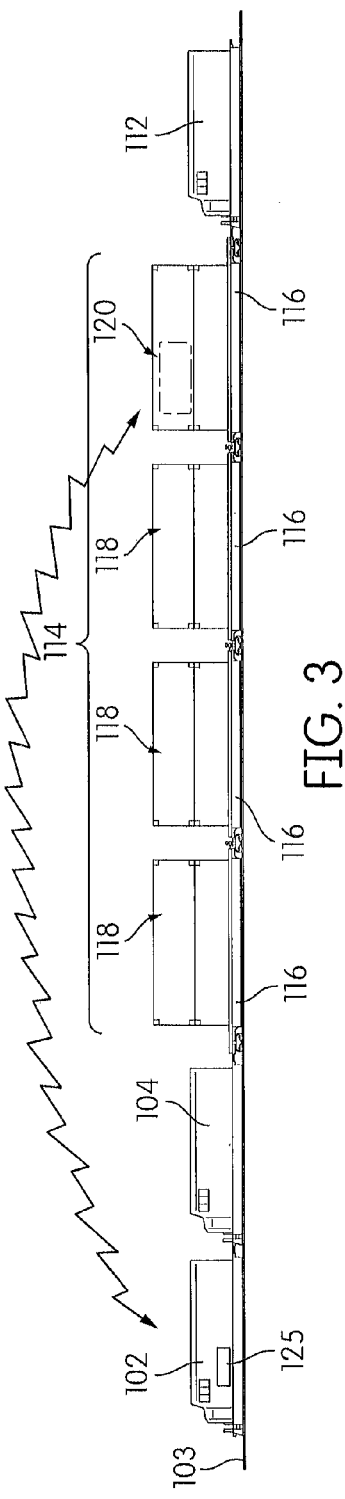
FIG. 3 illustrates an exemplary embodiment of a train employing a lead DP locomotive at and least one remote non-DP locomotive in accordance with an embodiment.

Referring now more particularly to the drawings, FIG. 3 illustrates a train 100 comprising at least one leading or "lead" locomotive 102 at a front end 108 of the train for pulling a series 106 (or set) of intermodal containers in cars 116 on railroad tracks or a pair of rails 103. In some cases, such as shown in the Figures, the intermodal containers may be stacked. A "car" may be generally referred to as a body with track engaging wheels and couplings that are connected in a train 100 for transporting items, and will become more evident by the description below. A "lead" locomotive is a first locomotive provided on a front end of a train, typically pulling a series of containers and/or cars.

In some cases, the train 100 is used to transport goods, cargo, and other items. Generally, throughout this description, the term "cargo" is used and defined as items for transport using the train 100. For example, cargo may comprise people, objects, liquids, and other transportable goods, and should not be limiting. One or more of the cars 116 may be configured to transport cargo in a series, for example. As such, to transport such cargo, in some embodiments one or more additional locomotives or locomotive consists may be provided within the length of the train to assist in moving the series of cars 116. In one embodiment, the leading or lead locomotive 102 is part of a locomotive consist, as shown in FIG. 1, comprising a collection of two or more locomotives 102 and 104 connected to each other in a series. Thus, for example, two or three locomotives may be provided at the front end of the train 100 to lead the train 100 along the tracks 103. Each locomotive 102, 104 in the consist comprises a body and track engaging wheels for moving cars 116. Additionally, one or more remote, trailing locomotives, such as remote locomotive 112 (and/or a remote consist), comprising a body and track engaging wheels is provided along the length of the train 100. A "remote" locomotive is a locomotive provided along a length of the train, behind or trailing the lead locomotive, e.g., locomotive 102. For example, an additional locomotive may be provided after a series 106 (or before or between a series) of cars 116. In some cases, it may be provided at the end of the length of the train. Alternatively, two or more locomotives (not shown) may form at least second locomotive consist to assist in moving a second series of cars. Generally, a remote or following locomotive (or locomotive consist) may be provided in any number of positions along the length of the train 100 to provide mid-train power. More than one remote, trailing locomotive can be provided and used in a train. In some cases, the placement of one or more locomotives or locomotive consists may be based upon the weight of the cargo or items being transported. The number of locomotives in the train 100, however, should not be limiting. The locomotives 102, 104, and 112, containers 118, and cars 116 are shown for illustrative purposes only and other configurations and quantities would be understood in the art.

The locomotive(s) 102, 104 and 112 also comprise a power system for driving the track engaging wheels of the locomotive(s) 102, 104, and 112 to move the locomotive(s) and the cars 116 along the tracks 103. The power system may be of any type, including but not limited to a diesel engine, an AC or DC generator powered by a diesel engine, a fuel cell, a battery, a flow battery, or any other system for providing locomotive power.

The freight cars 116 of the one or more series 106 of cars along the length of the train may be loaded or empty. The cars 116 may be any type of car and any combination of types of cars. For example, types of cars 116 in train 100 may include, but are not limited to, flat or gondola cars, box cars, tanks, hopper cars, and well cars. In some embodiments, one or more of the cars 116 may be configured to include one or more containers for storing cargo. For example, a car 116 may comprise a well car for receiving a container for transportation. Generally, containers are used to store and transport goods, cargo, and other items, as is known in the art. The containers may comprise containers that are removably or permanently mounted on a car body with wheels, and should not be limiting. For example, the containers may be intermodal, sealed, refrigerated, temporary, etc. Though the Figures illustrate a plurality of containers provided on the cars 116, it should be noted that it is envisioned that only some or none of the containers may be included in the train 100. That is, train 100 may include cars 116 designed to carry many types of cargo, and should not be limited to the illustrated embodiment.

In accordance with an embodiment, as shown, the series 106 may have sets 118 of stacked intermodal containers within the cars 116. For illustrative purposes only, each set 118 of stacked intermodal containers as herein described comprises a top container stacked or mounted on a bottom container, as referred to herein as a double stack. The mounting and/or locking of top and bottom intermodal containers to each other in a stack is generally known to one of ordinary skill in the art, but is generally discussed below. However, it is to be understood that each car 116 may carry one, two, or three intermodal containers, of similar or different sizes, or no intermodal containers, and, as such, the configuration of stacking should not be limiting. Each car 116 can be a stack car, also known as a double stack car or well car, which is a railroad car designed to carry intermodal containers. The cars 116 are connected in series and are pulled (or pushed) by one or more locomotives 102, 104 and/or 112. Though the Figures illustrate a plurality of intermodal containers provided on the cars 116, it should be noted that it is envisioned that only some or none of the containers may be included in the train 100. A few sets of containers 118 are shown in FIG. 3 as part of a series 106 for simplicity purposes only and should not be limiting. That is, train 100 may include cars 116 designed to carry many types of cargo and/or types of containers, and should not be limited to what is illustrated. The cars 116 of each series 106 along a length of a train may be loaded or empty, single or stacked.

In addition to the stacked sets 118, an additional stack 120 is provided adjacent to remote locomotive 112. Specifically, as shown in detail in FIG. 4, the additional stack 120 is placed on a car directly in front of remote locomotive 112, at the end of the series 106. The additional stack 120 can be a double stack of containers that includes at least one container with a distributed power (DP) control system contained therein. More specifically, in accordance with one embodiment, a DP control system is provided in an ISO, non-freight carrying intermodal shipping container to provide locomotive distributed power (DP) control to non-DP locomotives at a number of positions along the length of the train.

Again, it is noted that in rail transport, distributed power (or "DP") as known by one of ordinary skill in the art typically refers to the placing of additional DP-equipped locomotives at intermediate points (e.g., middle) in the length of the train to control or operate the DP-equipped locomotives on longer trains using an active, leading locomotive. Each of the additional DP-equipped locomotives is remotely controlled by or from the leading locomotive. Distributed power thus describes a distribution of power throughout the length of a train of separate locomotives (either single locomotives or in consists). The power itself is not distributed from one locomotive to another, but rather the locomotives themselves each generate power and are located throughout the consist. The power is distributed in the sense that one locomotive acts as a master unit and the others as slave units, and the master unit sends wireless signals to the slave unit(s) so that they generate power in a coordinated manner. The term multiple unit ("MU") can sometimes refer to such separate locomotives that are capable of coupling and operating with other units and for control by the leading locomotive.

However, as noted previously, use of multiple DP locomotives has its disadvantages. For example, in the prior art, each locomotive must be fitted with DP equipment for set up and control. By installing a distributed power control system in an ISO intermodal shipping container as disclosed by the embodiments herein, locomotive distributed power (DP) control can be provided to non-DP locomotives at a number of positions along the length of the train.

Accordingly, in order to provide distributed power (DP) control to a remote, trailing non-DP locomotives, in accordance with an embodiment of this disclosure, a non-freight carrying intermodal container 124 is provided with a DP control system 126. For explanatory purposes only, such a container 124 is referred to as a "DP container" or "DP intermodal container" throughout this disclosure. The DP container 124 can be provided as part of a stack 120 (e.g., double or triple stack) in or on a car, or as a single container in or on a car adjacent to a non-DP locomotive (or non-DP locomotive consist). It can be a bottom container, a middle container, or a top container in a stack. In an embodiment, DP container 124 is non-freight carrying, non-revenue earning container. In one embodiment, DP container 124 is placed directly adjacent a remote locomotive or locomotive consist in a train, so that any locomotive is it connected to can be controlled as a DP remote unit, whether or not it is a DP-equipped unit. This provides operational flexibility with regards to controlling non-DP locomotives using lead DP locomotives in trains.

For example, as shown in FIG. 3, the lead locomotive unit 102 is a DP-equipped lead unit at front of train with a command system 125 for sending instructions and/or commands to control one or more remote, trailing locomotives connected for communication therewith, within the train 100. Lead locomotive 102 is followed by an optional non-DP locomotive 104 and has a remote non-DP locomotive 112 at the end of the series 106. In FIG. 3, the remote non-DP locomotive 112 also appears to be shown at the end of the length of the train, which is not meant to be limiting.

Accordingly, a lead locomotive in this disclosure is a first locomotive provided on a front end of a train, pulling a series of containers and/or cars, and is a distributed power (DP) locomotive equipped with a main controller or system (e.g., command system 125) for controlling one or more following locomotives provided behind the lead locomotive along the length of the train that are MUs, or locomotives capable of coupling and operating with other units and for control by the leading locomotive. In particular, in accordance with an embodiment herein, the lead locomotive is configured for communication with a distributed power control system provided within a DP container 124 that is connected to a remote locomotive and configured to control a braking system of the remote locomotive according to instructions and/or commands transmitted by the lead locomotive. For example, the command system 125 can provide control of remote locomotive(s) by sensing command signals and transmitting instructions and/or commands to the remote units. The command system 125 can control different types of braking and train line control systems, such as a throttle, for example, of a following or remote locomotive (e.g., the throttle and systems of a remote locomotive may need to be adjusted to control the speed and/or load through the length of the train as it moves along a track).

A remote locomotive in this disclosure then is not only a locomotive provided along a length of the train (behind or trailing the lead locomotive) that is configured to assist in moving the series of containers, but also that is a non-distributed power (non-DP) powered locomotive configured to be controlled by the DP system of the lead locomotive. A remote locomotive is capable of coupling and operating with other units and for control by the leading locomotive (e.g., 102). The illustrated adjacent, trailing locomotive 104 can also be considered a remote locomotive. In one embodiment, trailing locomotive 104 is also a non-DP powered locomotive that is configured to communicate with and/or receive instructions from lead locomotive 102.

Figure 4:
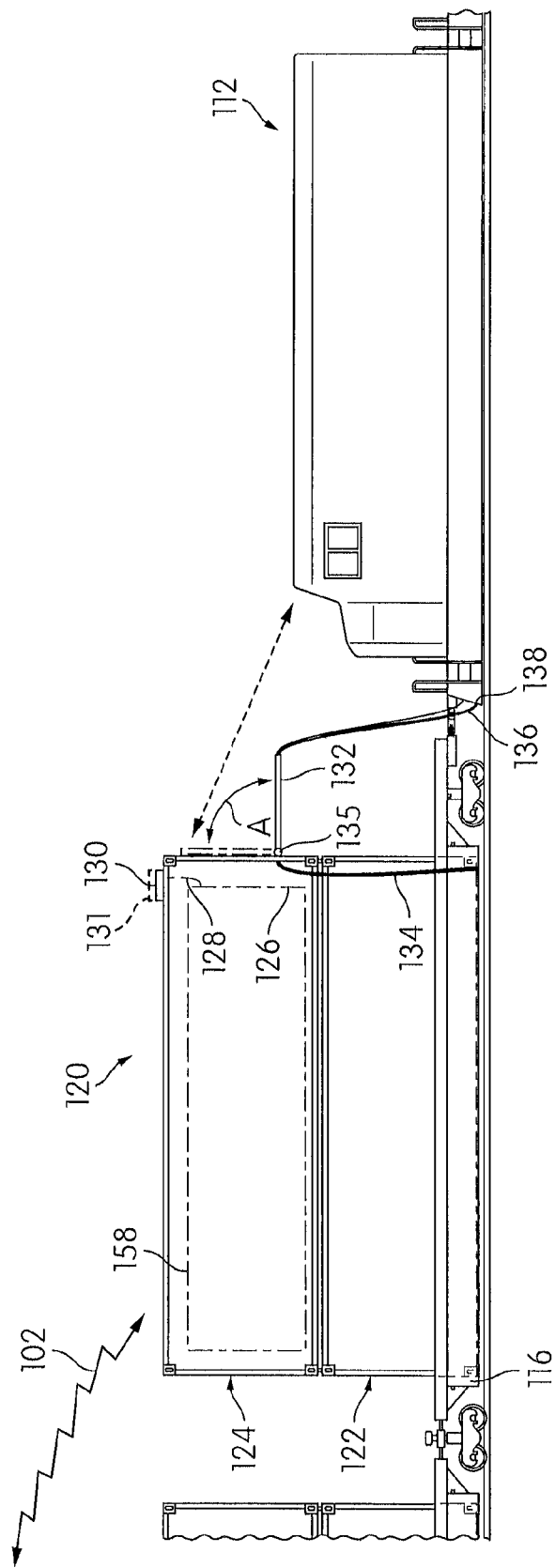
FIG. 4 illustrates a detailed view of a connection of a DP system in a DP intermodal container with a remote non-DP locomotive in accordance with an embodiment.

In FIGS. 3 and 4, DP container 124 is shown as a top container of stack 120 (e.g., double stack) in front of at least one remote, trailing locomotive 112 in accordance with one embodiment of this disclosure. The DP intermodal container 124 is placed on top of a bottom container in well car 116 secured thereto (e.g., using corner fittings 150). Bottom container 122 is or can be an intermodal container that is configured to receive goods or freight therein (i.e., a revenue earning container). The bottom intermodal container 122 may also or alternatively include a magnetic mount thereon for DP data radio antennas. DP container 124 is provided for connection with the remote locomotive 112. The distributed power control system 126 of the DP container 124 is configured to communicate with at least the command system 125 of the lead locomotive 102 of train 100 and the remote locomotive 112. The system 125 in DP container 124 can receive instructions from lead locomotive 102 and communicate with the related systems (e.g., brakes) of the remote locomotive 112 for controlling their operation, for example.

However, as previously noted, alternatively, in one embodiment, the DP container 124 is provided in a rail car 116 itself. In another embodiment, it is provided as a bottom or middle container. DP container 124 can be provided in a car or stack at any number of places along the entire length of the train, e.g., within the middle of the length of the train (mid-train), near the end of the train, etc., where a second or remote, trailing locomotive, configured to receive signals from the first DP locomotive 125 (e.g. see FIG. 3), is positioned.

Figure 5:
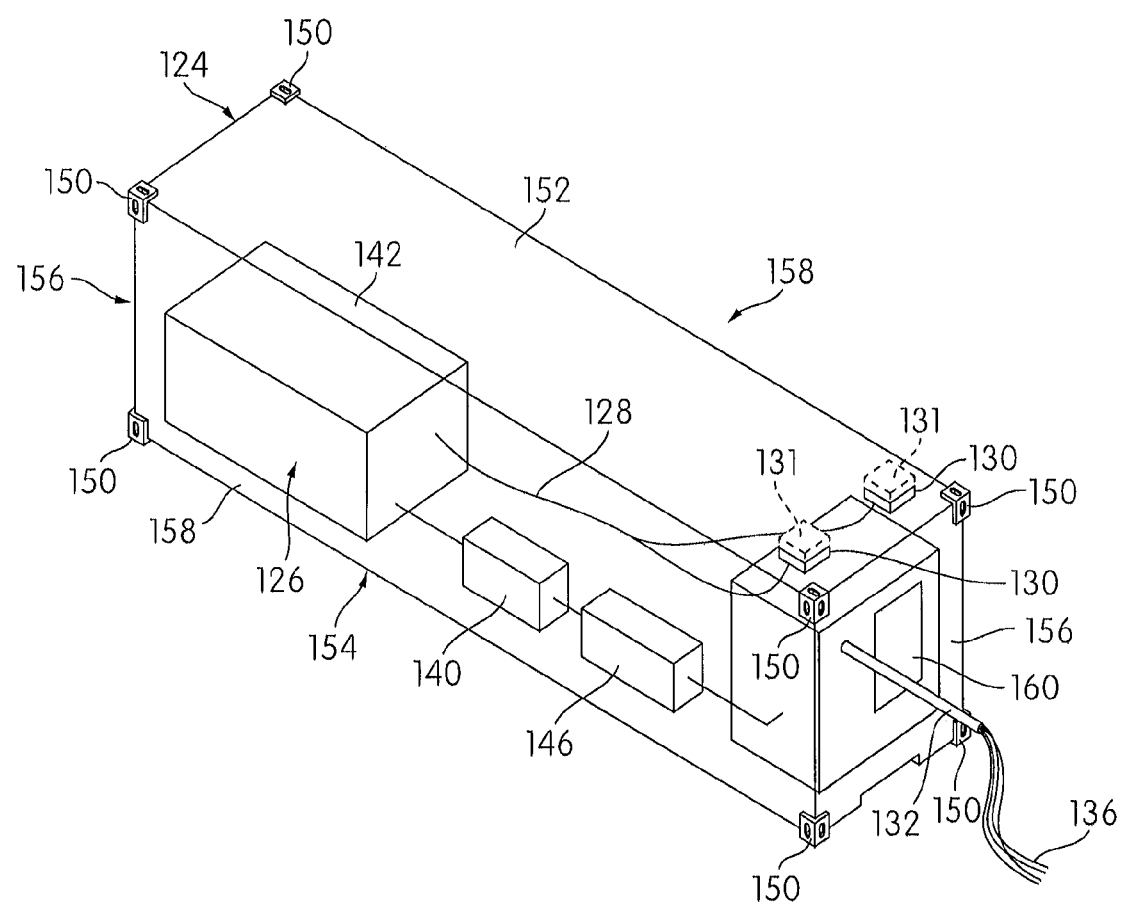
FIG. 5 illustrates a perspective view of a non-freight carrying intermodal container with a DP system therein, in accordance with an embodiment.

FIG. 5 shows a more detailed view of the DP intermodal container 124 shown in the double stack illustrated in FIG. 4. Specifically, in the illustrated embodiment, the DP container 124 is provided in a rail car 116 that is provided in a rearmost or last position in a series 106 of cars within the length of the train, with a non-DP locomotive 112 behind it. The series 106 can be provided any number of places along the entire length of the train, e.g., within the middle of the length of the train (mid-train), near the end of the train, etc., that a second or remote, trailing locomotive is configured to be positioned adjacent to and behind the series. Any number of remote locomotives 112 and DP intermodal containers 124 can be provided in the train 100. In one embodiment, a DP container 124 is configured to be provided adjacent to each remote, trailing locomotive 112 in the train for control by the lead DP locomotive 102.

The non-freight carrying DP intermodal container 124 includes a body having an intermodal container compatible configuration comprising a top wall 152, a bottom wall 154, front and back end walls 156, and side walls 158 connected by a frame to form an enclosed box, for example, as shown in FIG. 5. The DP container 124 may comprise various sizes and features. As generally known in the art, the side walls and/or end walls may comprise doors, steps, and/or openings allowing access to contents being held therein. The doors may be provided on a back wall, near the rear of the container, near the front of the container, on the sides of the container, or even access via the top of the container. In an embodiment, a lockable door 160 is provided at an end of the container 124 to allow for access to the distributed power control system 126 inside. Such doors and/or steps of the container can provide access to DP equipment inside the body, for example, should the DP system 126 or its parts need repair or replacement.

The dimensions or sizes of the containers should not be limiting. For example, standard ISO shipping containers comprising dimensions of approximately 10 to approximately 53 feet long, approximately 8 feet to approximately 9 feet 6 inches high, and approximately 8 feet to approximately 8 feet, 6 inches wide may be used for DP container 124. Also, a structure or frame (not shown) of the container may also facilitate stacking. The DP container 124 also comprises corner fittings 150 at each corner comprising a plurality of connection openings or apertures. The "corner fittings" 150 are defined as fittings provided at a corner where the top wall 152/bottom wall 154 and side walls 158 meet. They may also be at a corner where the top wall 152/bottom wall 154, side walls 158 and end walls 156 meet; however, that is not necessary. The corner fittings 150 and their openings are also in accordance with ISO standards. An example of such a standard for corner fittings 150 is ISO 1161:1984, which is hereby incorporated by reference in its entirety, as known at the time of filing. For example, in a standard 40 foot length ISO container, the corner fittings 150 are provided at the corners defined by a meeting of the top 152/bottom 154, side 158, and end walls 156. In a larger container, however, such as a 48 foot or a 53 foot length ISO container, two sets of corner fittings 150 may be provided—one set is provided at the corners defined at the meeting of the top 152/bottom 154 and side walls 158, and a second set is provided along the frame at an area that is spaced inwardly from the end walls 156. More specifically, the second set is spaced from the end walls 156 such that the corner fittings 150 are provided at a same location as a smaller, 40 foot length ISO container, for example. As is known in the art, this allows for intermodal containers to be stacked and connected to each other, despite their overall lengths.

The connection openings of the corner fittings 150 are commonly used to connect or releasably lock a top container to a bottom container when mounted on each other to form a stack/double stack, for example. The DP intermodal container 124 may be used as a top, a middle, or a bottom container and mounted with another container (or two) to form a stack/double stack, for example, as is thus not limited to the illustrated example of the drawings. The DP container 124 can be placed on and transported in the same manner as conventional rail intermodal cars, such as in double-stack well cars (e.g., see FIG. 3). Devices such as twist locks or other rotatable locking devices which are inserted into the openings may be used to connect and lock containers to each other or to the cars 116. The connection openings may also be used to lift a container. The connection openings of the corner fittings 150 comprise an opening, hole, or aperture for receiving a securing, clamping, or connecting device. The opening, hole, or aperture may be circular, oval, or any other shape, although they are typically elongated in shape. The corner fittings 150 are also designed to meet ISO standards and/or specifications. The corner fittings 150 may be made from a number of materials including, but not limited to, aluminum, stainless steel, and carbon steel. Generally, eight (8) corner fittings 150 are provided on a container (two top right, two top left, two bottom right, two bottom left).

The DP intermodal container 124 is equipped with a suitable distributed power control system 126 that is installed inside the container 124. The distributed power control system 126 in the container 124 is used to receive and send commands to remote locomotive 112 (e.g. see FIG. 4). In some cases, the system 126 is configured to control the braking system of the remote locomotive 112.

The distributed power control system 126 can comprise any number of components for controlling remote locomotive 112. In this exemplary embodiment, the distributed power control system 126 includes at least a controller 140, a power source 142, an air turbine 144, an air brake controller 146, and at least one communication device. Of course, the devices provided inside and/or associated with the DP container 124 as shown in the Figures should not be limiting. For example, an air compressor may be provided to supply a source of pressurized air to the remote locomotive 112 (i.e., via lines or cables 136) for controlling braking power. Also, controllers 140 and 146 may be physically combined into a single device or system with one or more processors.

In some cases, the devices of the control system 126 are secured to at least a bottom wall 154 or floor of the inside of the container 124. The distributed power control system 126 can include data radios, a display screen, an electronic air brake rack, etc. In one example, a system similar to GE Transportation Systems product called LOCOTROL® can be installed in DP container 124 to control and send signals from the lead locomotive 102 via a radio link to control one or more remote control locomotives 112. As another example, in some embodiments, the distributed power control system 126 in DP container 124 may comprise elements such as those shown in U.S. patent application Ser. No. 12/276,378, filed Nov. 23, 2008 and published as 20100130124 A1 on May 27, 2010, which is hereby incorporated by reference in its entirety.

Figure 6:
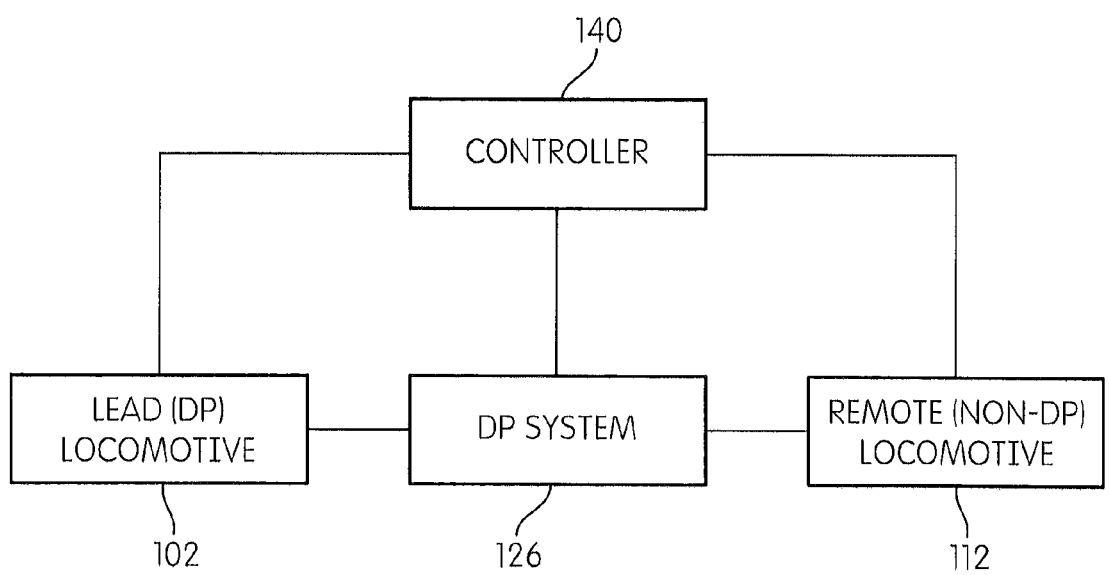
FIG. 6 illustrates a system diagram of the communication between the lead DP locomotive, DP system in the intermodal container, a controller, and the remote non-DP locomotive in accordance with an embodiment.
Figure 7:
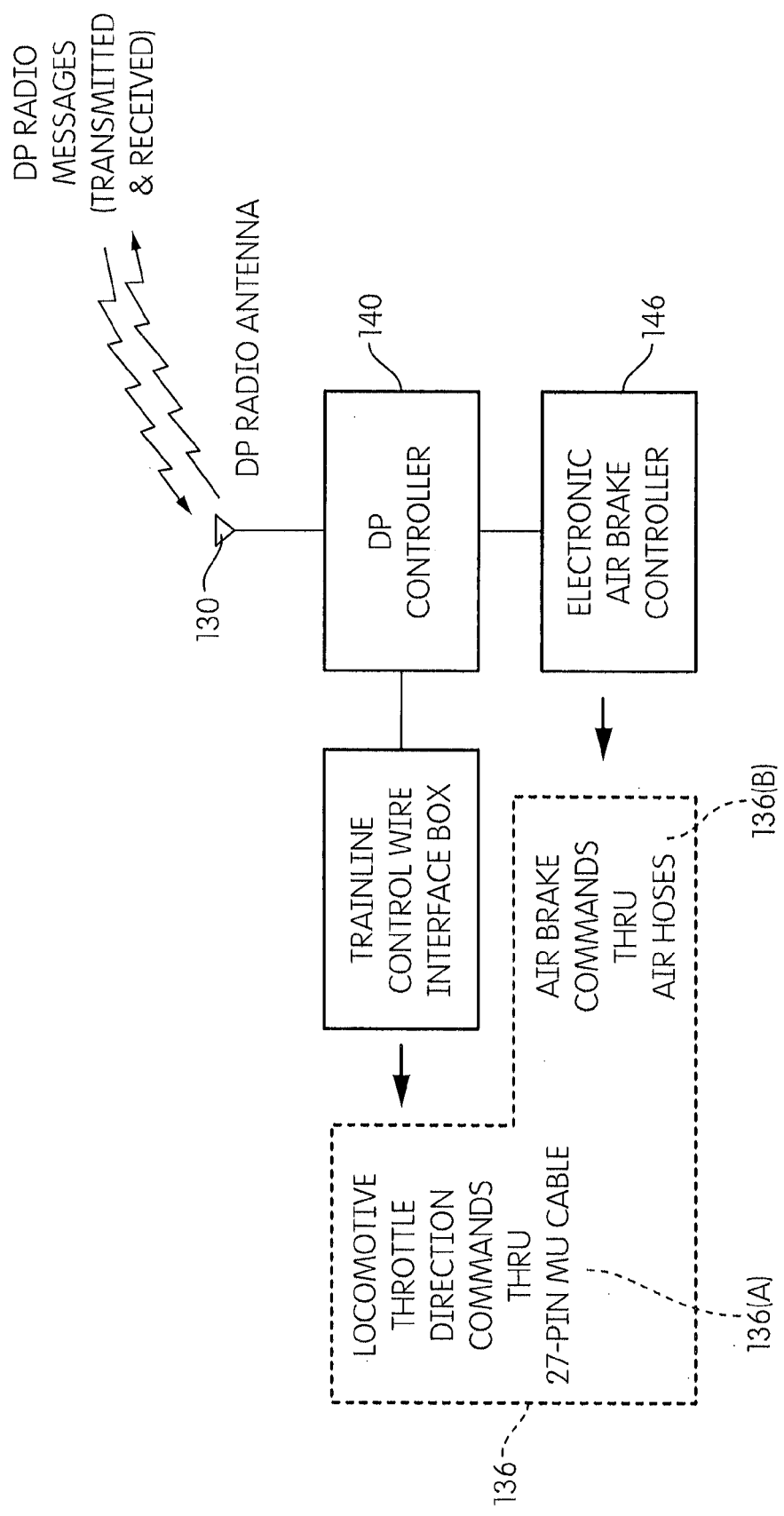
FIG. 7 illustrates an exemplary distributed power control diagram for controlling a remote locomotive in accordance with an embodiment.

The distributed power control system 126 is provided to control the application of a brake system of the remote locomotive 112. The distributed power control system 126 may be used, for example, to control the amount of power (e.g., zero, some, all) for braking. As shown in the system diagram of FIG. 6, for example, the distributed power control system 126 may include at least a processor (e.g., a microprocessor) and/or a controller 140 (and/or controller 146, not shown) that communicates to start, adjust, or braking of the remote locomotive 112. The controller 140 and/or controller 146 can receive commands from lead locomotive 102 (via communication device(s) 131) and translate them into MU commands and brake pipe commands for the remote locomotive 112. For example, as shown in FIG. 7, distributed power messages can be transmitted and received via a communication device mounted on a mounting device 130 (described later) of the DP container 124. The antenna attached to the mounting device 130 communicates with DP controller 140 and/or electronic air brake controller 146. Controllers 140 and 146 may further communicate with each other. The DP controller 140 and/or brake controller 146 may be in communication with and/or connected to a trainline control wire interface box. This interface box may be a junction box, for example, that connects with one or more of the hoses 134 and/or cables 136 connected to remote locomotive 112. The controllers 140 and 146 and interface box are configured to thus send commands and/or signals via at least cables 136 to systems of the remote locomotive 112. As shown in FIG. 7, for example, locomotive throttle direction commands 136(A) can be sent through a 27-pin MU cable, and/or air brake commands 136(B) can be sent through air hoses, to the locomotive 112. Of course, such communication and commands are exemplary and not intended to be limiting.

The controller 140 and/or controller 146 can be permanently installed within the intermodal container body of DP container 124. Generally, the use of such controllers 140 and 146 are known in the art, and therefore, are not described in great detail herein.

The type of power source 142 used with the distributed power control system 126 may be any type of power source, including, but not limited to, a generator, an onboard diesel engine, onboard battery(ies), using compressed air from train's automatic braking pipes, regenerative power such as electricity from electronically controlled pneumatic (ECP) brakes, turbine (e.g., Wabtec turbine), and various other power sources. The power source 142 may be provided within the DP container 124, adjacent the container 124, or in a remote location with respect to the DP container 124. For example, in an embodiment, a diesel generator (e.g., DC flowing) is provided as the power source 142 within the DP container 124. In another embodiment, a 27-pin multiple unit (MU) trainline cable may be connected to an adjacent locomotive and then to the DP container 124 such that the locomotive may supply power that may be used as the power source 142. In another embodiment, an air-powered generator, such as an air turbine 144, for example, may be provided in the DP container 124 and used as the power source 142. For example, an air hose may be connected to a main reservoir (MR) air line hose on an end of the remote locomotive 112 that is adjacent to the DP container 124 and then to the DP container 124 to provide air to power the generator. In yet another embodiment, it is envisioned that a power cable may be connected between the DP container 124 and one or more locomotives adjacent thereto such that power is received from electronically-controlled pneumatic (ECP) braking. Accordingly, the DP container 124 may include MU air lines and/or MU cables 136 for connecting the DP container 124 and its system 126 with the remote locomotive 112. In one embodiment, the cables 136 extending from the DP container 124 are trainline connectors such as 27 point jumper cable assemblies, and/or air brake hoses, for example.

Also or alternatively, as shown in FIG. 4, for example, one or more hoses 134 (e.g., brake hoses) may be directed up into and through DP container 124 for connection with the distributed power control system 126 therein.

The lines and cables 136 may be connected to the DP container 124 either inside or outside. That is, the lines and cables 136 may be connected directly to the air turbine 144 and parts of the distributed power control system 126, or they may be connected to one or more of the walls 152-158 of the DP container 124 itself, with separate lines or cables inside connected to the parts and equipment of the distributed power control system 126.

A plurality of openings may be provided in the end walls 156 or floor or bottom wall 154 of the DP container 124 (as well as in the side walls 158) to facilitate passing of lines and cables 136, hoses 134, and the like from inside the DP container 124 for connection at a position near or at the bottom or end of the car 116 so that the lines and cables 136 can be connected to one or more connection points 138 on the remote (non-DP) locomotive 112. For example, cable connectors such as a 27-wire MU jumper cable(s) may be used to connect the distributed power control system 126 within DP container 124 with remote locomotive 112. MU air hoses can be provided on both sides (typically asymmetrically) on the locomotive 112, and brake pipe hoses or connections may be at each end.

In one embodiment, the lines and cables 136 extending from DP container 124 may be provided and protected by an extendible pipe or tube 132, for example. The tube 132 can extend from an end wall 156 of the container and protect a portion of the cables 136 therein, as shown in FIG. 5, for example. However, the location of the tube 132 is not meant to be limiting. For example, a tube in addition or alternative to the one shown may be provided to contain hoses 134. In one embodiment, the tube 136 is configured to swing relative to a wall of the DP container, such as end wall 156, between a stored position (e.g., positioned upwardly, adjacent or against the end wall 156) and a use position (e.g., swung downwardly, extending away from wall for connection with systems of remote locomotive 112. For example, the tube 136 may have a pivoting end 135 that is mounted to the respective (end) wall (156). However, the above-described embodiments are exemplary and are not meant to be limiting. Again, the tube 132 can extend from any of the walls or corners of the DP container 124. As another example, the extendible pipe or tube 132 need not be a stiff structure, but, rather, it can be a flexible or bendable structure, for example, that is positioned and/or secured such that the cables 136 can be connected (e.g., to connection point 138) to remote locomotive 112. The tube 132 can act as a protective casing as well as an enclosure for the cables, hoses, etc. extending from the DP container 124.

Further, it should be understood by that power drawn and used for operating the system and its parts within in the container is not limiting. For example, in accordance with one embodiment, the distributed power control system 126 is configured to draw up to a maximum of approximately 2 Amps for approximately 150 watts of power. In another embodiment, the distributed power control system 126 is operational at or less than approximately 75 watts.

In an embodiment, a stack or well car is provided for receipt of the stack with the DP container 124 and/or DP container 124 itself (if it is provided alone or on the bottom of a stack). FIG. 4 illustrates an example of such a car. Stack cars typically have some type of semi-open floor(s) which may facilitate in passing lubricator nozzles, hoses, and other parts down through the car floor. For example, a well car 116 may comprise a well body formed from well walls and a well floor. The well walls and floor form an area for receiving at least part of an intermodal container, such as DP container 124, therein. In some cases, the well floor may include a plurality of openings therein. Thus, such a floor may be utilized with the DP container 124—whether directly therein or provided as a top container of a stack—allowing for easy access to run and connect lines and cables 136 through such openings below the car and with one or more connection points 138 of remote locomotive 112. Such may be used in addition or alternative to the extendible tube 132. The car 116 generally also includes a pair of axle trucks at each end, the trucks including wheels for movement along the pair of rails 103 when the train 100 is in motion. The type of axle trucks used with the car 116 should not be limiting. For example, although not described in detail, it is to be understood that the trucks may include two pairs of wheels connected by axles which are designed to be positioned and rotated/pulled along the track 103 (i.e., each truck may comprise 4 wheels). The trucks may also include springs, brakes, bearings, rollers, and other parts and hardware as is known in the art.

Of course, it is also noted that the well car as shown in FIG. 4 is for illustrative purposes only. Other details or features may also be included in or on the car 116. In fact, a stack car or well car as shown in FIG. 4 need not be used with DP intermodal container 124. For example, in some embodiments, the DP container 124 may be provided on a gondola car or a flat car. Such cars are known in the art and therefore are not specifically described herein.

A communication device is provided to communicate instructions and/or commands to the controller 140 of the system 126. The control system 126 or the controller itself 140 may be provided to control a circuit, system, or processor by interpreting and executing instructions that are fed thereto. For example, instructions may be provided to a controller 140 for supplying, reducing, and/or stopping power fed to brakes of remote locomotive 112. Such instructions may be provided wirelessly, for example. In an embodiment, the power source 142 may include a system that is instructed by the controller 140 to supply air from turbine 144 to remote locomotive 112.

For purposes of this invention, a "communication device" is to be defined as any type of instrument, device, machine, or equipment which is capable of transmitting, acquiring, decrypting, or receiving any type of electronic, data, audio, radio transmissions, signals, or other communication information, or any part of a circuit, module, software, or other component that is capable of facilitating the transmission and receipt of information relating to the application of a brake system of a remote, non-DP locomotive that is operatively connected to the DP container 124 and its system elements. In an embodiment, the communication device may receive instructions based on sensed conditions by sensors of the command system 125 of the lead locomotive 102. The communication device may receive instructions via radio frequency (RF) communication via an antenna or a global positioning system (GPS) via satellite, for example. Of course, the methods of receiving such communication for controlling the braking system of remote locomotive 112 should not be limited to the disclosed embodiments.

The communication device can be mounted to the DP container 124 itself (see FIG. 4 and FIG. 5) or to another container (not shown) for communication with the lead locomotive 102. Specifically, one or more mounting devices 130 such as magnetic mounts can be provided on a top wall 152 of DP container 124 for mounting of one or more communication devices 131. The communication device 131 may be a radio antenna, for example. The mounting device(s) 130 can connect to and communicate with the distributed power control system 126 via a connection device 128 (wired or wireless), as shown in FIG. 5. The connection device 128 allows some or all of the parts (controllers 140 and 146, power source 142, air turbine 144) to communicate with each other and/or receive commands or signals from the communication device(s) 131, so that the distributed power control system 126 can control the connected remote locomotive 112. In an embodiment, the communication device 131 may be used to communicate with the controller 140 of the control system 126.

In some embodiments, a large amount of cars may be provided in the length of the train. Therefore, the DP container 124 may be coupled or mounted relative to any number of remote locomotives 112 or consists. Although FIGS. 3-5 show the DP container 124 provided in front of the remote locomotive 112, it should be understood to one of ordinary skill in the art that DP intermodal container 124 may be provided directly behind remote non-DP locomotive unit(s) 112 in a mid-train position or other position along the length of the train, and that it connection devices may accessible through doors, openings, and/or lines and cables 136 at an opposite end of the DP container 124.

Also, it is noted that an intermodal container for DP container 124, as herein described, is defined as a box container, bulk container, tank, or other storage device comprising a structure or frame that allows for stacking and mounting on top of one another. Generally such containers are also referred to as "ISO containers," as they are manufactured according to specifications from the International Standards Organization (ISO) and are suitable for multiple transportation methods such as truck and rail, or rail and ship. For example, known standards for such containers are ISO 1496, ISO 668, and ISO 6346. In some embodiments, the intermodal containers may be manufactured in accordance with ISO 668:1995 and ISO 6346:1995, both of which are hereby incorporated by reference in their entirety, as known at the time of filing.

In accordance with an embodiment, the DP container 124 is further configured to include more than distributed power control system 126 therein. For example, a TOR rail lubrication system, such as disclosed in U.S. patent application Ser. No. 12/558,472, filed Sep. 11, 2009, and hereby incorporated by reference in its entirety herein, can be provided in the DP container 124 for improved fuel efficiency, rolling and drag reduction of part of the train along rails 103.

Alternatively, however, it should be noted that the position of the DP container and connected non-DP locomotive should not be limited to the rearmost position in the length of the train as shown and illustrated in FIGS. 3 and 4. That is, it should be understood that the DP container and the non-DP locomotive may be positioned within the length of the train, e.g., at a midpoint or within the length of the train where additional power may be needed.

The DP intermodal container 124 as disclosed herein is capable of interfacing with any type of braking system, including pneumatic vacuum and electronic air brakes. It can be connected with both electric and diesel locomotives and can aid in optimizing the distribution of power and braking control over the entire length of the train though commands received from command system 125 of a lead locomotive 102.

The DP intermodal container 124 does not require that each locomotive within the train 100 be DP-equipped. To implement DP container 124 in a train 100, only one lead DP-equipped locomotive 102 is required for operations of the train. Using a containerized DP system as disclose d herein to control remote locomotive(s) 112 reduces capital investment, while still providing fuel and safety benefits of distributed power technologies. For example, distributed power reduces physical forces on the train, making it less prone to derailments, and facilitates more even braking to reduce wheel and track wear. Distributed power also provides a fuel savings of 4-6 percent compared to standard locomotive power.

By providing DP control system equipment within an ISO standard intermodal container, additional advantages are perceived.

For example, the DP intermodal container 124 allows for easy replacement and positioning of the container 124 along the length of the train 100 due to its corner fittings 150. For example, the modified intermodal container 124 may be moved and positioned in any of the cars 116 when parked at a yard. Also, there is no need to adjust or manufacture special devices when using the DP intermodal container 124. The interface between the modified DP intermodal container 124 and rail car 116 (e.g., well or stack car, gondola car, or flat car) remains the same.

Additionally, using a DP container 124 as disclosed herein provides a relatively easy method of providing DP control of remote locomotives, without disadvantages of needing DP-equipped locomotives and/or equipment for installing onboard locomotives. The DP intermodal container 124 allows for easy movement of the DP control system 126 along the length of the train 100.

More specifically, the DP container 124 allows for handling and movement in a rail yard using existing equipment, i.e., container cranes, drayage chasses, lift devices, spreader beam structures, and tractors. No yard switcher locomotive or crew activities are required. For example, in the instance when a train arrives at its destination and is parked for unloading, the DP container 124 can be removed from the car 116, placed onto a container chassis and pulled by a yard tractor to the other end of the yard. The DP container 124 may then be lifted from the container chassis and placed in or on a car 116 in another train, adjacent a remote locomotive 112 in another train. Before leaving the yard, the DP container 124 and locomotive 112 can be connected. This increased portability in a train yard results in the ability to stack the container and to position the container at multiple locations in a train.

Also, the DP technology and equipment installed in a modified container would generally cost the same if not less than as the DP equipment installed on a typical DP-equipped locomotive (e.g., approximately $100,000). The herein disclosed DP container 124 provides a financial advantage, however, in that fewer DP-equipped containers like DP container 124 would be needed to control remote locomotives as compared to typical DP-equipped locomotives. This use of a reduced amount of DP containers as compared to DP-equipped locomotives is because containers can be more quickly moved within a rail yard than locomotives. Locomotives, being large machines (typically, 70' long, 200+ tons) which can only move on railroad tracks, are relatively time consuming and difficult to move within a rail yard where freight trains are assembled. In a typical 2-mile long rail yard, for example, it can take as much as eight (8) hours to move a locomotive from end-to-end and to reposition it within a train, e.g., from an inbound train to an outbound train. A container such as DP container 124, on the other hand, can be repositioned in as little as approximately fifteen (15) minutes, by crane-lifting and/or being driven to another location in a rail yard using a rubber-tired truck. Thus, time is also saved by implementing the DP intermodal container 124 within a length of a train.

Using the rail yard equipment is advantageous for a number of reasons. For example, such equipment exists in rail yards and thus need not require special devices for moving or mounting the DP intermodal container 124. Modifications of rail yard equipment are not required. Besides the time saved, using such equipment also reduces the amount of effort and manpower required. For example, in some embodiments, only a crane operator and ground operator are required. Typically, to move a locomotive with distributed power from one end of a yard to another, movement is required along tracks and through track switches. Such a process requires a minimum of two workers and all tracks and switches must be unobstructed by other trains, locomotives, and/or freight cars. With the system as disclosed herein, the DP intermodal container 124 can be easily lifted or driven on a vehicle by a single worker/drive from one end of a yard to another. There is no interference was with moving a locomotive over tracks and switches.

The DP intermodal container 124 is also advantageous as it is designed such that it may be easy to install by operators as the container need not be adjusted or modified since it uses existing holes and openings (e.g., corner fittings 150) and equipment. The DP container 124 also allows for simplified installation (or removal) without risk of harm or injury to the container or the operators.

The containerized approach of the lubrication equipment in the container 124 provides an application that it easily maintained and decreases maintenance costs because if the onboard distributed power control system equipment in the container becomes defective, the entire intermodal container 124 can be hauled (e.g., via highway chassis and tractor) to a repair point or location, instead of the difficulty and cost of taking a DP-equipped locomotive to a locomotive repair shop. Alternatively, one could access and/or replacement the components of the system 126 within the container 124, and need not transport the entire container itself. Furthermore, the cost for installing equipment in the intermodal container 124 is quite low compared to the traditional locomotive approach, as it requires little to no adjustment of the intermodal container itself, the cars 116 at which it is mounted, and minor costs for the devices used for mounting parts of the distributed power control system 126.

Also, installation of the distributed power control system within the intermodal container contains the equipment, and helps reduce shock and vibration to the equipment.

The methods and/or devices used to control or communicate with the DP intermodal container 124 and its components should not be limited to the described embodiments. Also, any of the above wireless technologies and communication devices may be used alone or in combination with other devices for accurately controlling at least brake system of remote locomotive 112.

It should be noted that the design of the non-freight carrying DP intermodal container 124, distributed power control system 126 and its parts, or car 116 should not be limited to those mentioned, and it is envisioned that several designs may be used. Additionally, the materials used to manufacture the DP container 124 and its associated devices should not be limiting. For example, in some embodiments, the mounting structures may comprise materials such as aluminum or other metals.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A non-freight carrying intermodal container comprising:
   a non-freight carrying body configured for stacking with another intermodal container, the body having an intermodal container compatible configuration comprising a top wall, a bottom wall, end walls, and side walls connected together to form a box with corners at each junction of three of the walls and having corner fittings at each corner, the corner fittings comprising a plurality of connection openings each configured to receive a part of a mounting device;
   a distributed power control system contained within the body comprising at least a controller for controlling application of a brake system, the controller configured to communicate with and receive instructions and/or commands from a command system of a lead distributed power locomotive within a train, and
   one or more connection hoses configured to connect the distributed power control system within the body to a non-distributed powered locomotive positioned adjacent to the non-freight carrying intermodal container to control application of at least the brake system of the non-distributed powered locomotive.

2. The container according to claim 1, wherein the container is configured to be provided on a car for moving the container along a train track.

3. The container according to claim 2, wherein the car is a gondola car.

4. The container according to claim 2, wherein the car is provided adjacent to a remote locomotive provided within a length of a train for moving along the train track.

5. The container according to claim 4, wherein the container is configured for placement on the car directly in front of the remote locomotive in the train.

6. The container according to claim 2, wherein the car is a well car.

7. The container according to claim 1, further comprising a wireless communication device associated with the distributed power control system that is configured to receive commands for supplying power to the braking system from the command system of the lead distributed power locomotive.

8. The container according to claim 7, wherein the wireless communication device receives instructions via radio frequency communication or GPS.

9. The container according to claim 1, wherein the distributed power control system is further configured to control a throttle of the non-distributed powered locomotive.

10. A train comprising:
    a lead locomotive having track engaging wheels for pulling the train along a pair of tracks, the lead locomotive being located at a front end of the train and having a distributed power command system for sending instructions and/or commands to one or more remote locomotives within the train;
    a plurality of container cars coupled rearward of the lead locomotive, each container car comprising track engaging wheels for moving along the pair of tracks, wherein one or more of the container cars comprises a set of intermodal containers stacked one atop each other;
    a remote, non-distributed power locomotive having track engaging wheels for pulling the train along the pair of tracks, the remote, non-distributed power locomotive being located within the length of the train; and
    a non-freight carrying body having an intermodal container compatible configuration configured for stacking with another intermodal container in a container car, the non-freight carrying body having a distributed power control system contained within the body for receiving instructions and/or commands from the lead locomotive and one or more connection hoses extending from the distributed power control system and connected to the remote, non-distributed powered locomotive to control application of at least the brake system of the remote, non-distributed powered locomotive.

11. The train according to claim 10, wherein the non-freight carrying body is an intermodal container comprising a top wall, a bottom wall, end walls, and side walls connected together to form a box with corners at each junction of three of the walls and having corner fittings at each corner with connection openings configured to receive a part of a mounting device.

12. The train according to claim 11, wherein the intermodal container is provided on a car for moving the intermodal container along the pair of tracks.

13. The train according to claim 12, wherein the car is provided adjacent to the remote, non-distributed power locomotive.

14. The train according to claim 12, wherein the car is a well car.

15. The train according to claim 12, wherein the car is a gondola car.

16. The train according to claim 13, wherein the intermodal container is placed on the car directly in front of the remote, non-distributed power locomotive.

17. The train according to claim 16, wherein the intermodal container is a top container in a stack of at least two containers, and wherein a bottom container is a freight-carrying container.

18. The train according to claim 16, wherein the intermodal container is a bottom container or a middle container in a stack.

19. The train according to claim 16, further comprising a wireless communication device associated with the distributed power control system that is configured to receive commands for supplying power to the braking system from the command system of the lead locomotive.

20. The train according to claim 19, wherein the wireless communication device receives instructions via radio frequency communication or GPS.

21. The train according to claim 10, wherein the distributed power control system is further configured to control a throttle of the remote, non-distributed powered locomotive.

22. A train comprising:
a lead locomotive having track engaging wheels for pulling the train along a pair of tracks, the lead locomotive being located at a front end of the train and having a distributed power command system for sending instructions and/or commands to one or more remote locomotives within the train;
a plurality of cars coupled rearward of the lead locomotive, each car comprising track engaging wheels for moving along the pair of tracks;
a remote, non-distributed power locomotive having track engaging wheels for pulling the train along the pair of tracks, the remote, non-distributed power locomotive being located within the length of the train; and
a non-freight carrying body having an intermodal container compatible configuration configured for stacking with another intermodal container in or on a car adjacent to the remote, non-distributed power locomotive, the non-freight carrying body having a distributed power control system contained within the body for receiving instructions and/or commands from the lead locomotive and one or more connection hoses extending from the distributed power control system and connected to the remote, non-distributed powered locomotive to control application of at least the brake system of the remote, non-distributed powered locomotive.

23. The train according to claim 22, wherein the non-freight carrying body is an intermodal container comprising a top wall, a bottom wall, end walls, and side walls connected together to form a box with corners at each junction of three of the walls and having corner fittings at each corner with connection openings configured to receive a part of a mounting device.

24. The train according to claim 22, wherein the non-freight carrying body is provided on a car for moving the non-freight carrying body along the pair of tracks.

25. The train according to claim 24, wherein the car is a well car.

26. The train according to claim 24, wherein the car is a gondola car.

27. The train according to claim 22, further comprising a wireless communication device associated with the distributed power control system that is configured to receive commands for supplying power to the braking system from the command system of the lead locomotive.

28. The train according to claim 27, wherein the wireless communication device receives instructions via radio frequency communication or GPS.

29. The train according to claim 22, wherein the distributed power control system is further configured to control a throttle of the remote, non-distributed powered locomotive.

30. The train according to claim 22, wherein the non-freight carrying body is provided on the car directly adjacent to the remote, non-distributed power locomotive.

* * * * *